United States Patent
Halasy-Wimmer et al.

(10) Patent No.: US 6,889,800 B2
(45) Date of Patent: May 10, 2005

(54) OPERATING DEVICE FOR AN ELECTROMECHANICALLY ACTUATED DISK BRAKE

(75) Inventors: Georg Halasy-Wimmer, Markgröningen (DE); Jürgen Völkel, Frankfurt (DE)

(73) Assignee: Continental Teves AG & Co. oHG, Frankfurt (DE)

(*) Notice: Subject to any disclaimer, the term of this patent is extended or adjusted under 35 U.S.C. 154(b) by 0 days.

(21) Appl. No.: 10/363,452

(22) PCT Filed: Aug. 31, 2001

(86) PCT No.: PCT/EP01/10084
§ 371 (c)(1),
(2), (4) Date: Mar. 4, 2003

(87) PCT Pub. No.: WO02/21010
PCT Pub. Date: Mar. 14, 2002

(65) Prior Publication Data
US 2003/0178264 A1 Sep. 25, 2003

(30) Foreign Application Priority Data

| Sep. 4, 2000 | (DE) | 100 43 387 |
| Jun. 11, 2001 | (DE) | 101 28 251 |

(51) Int. Cl.[7] ............................................ F16D 55/08
(52) U.S. Cl. ...................... 188/72.8; 188/162; 188/71.9
(58) Field of Search ............................. 188/158, 162, 188/72.1, 72.3, 72.8, 71.8, 71.9; 74/89.33, 89.23

(56) References Cited

U.S. PATENT DOCUMENTS

| 4,035,697 A | * | 7/1977 | Arnold, Jr. ................. 361/289 |
| 4,137,784 A | * | 2/1979 | Griffin ....................... 74/89.37 |
| 4,865,162 A | * | 9/1989 | Morris et al. ............... 188/72.8 |
| 5,769,189 A | * | 6/1998 | Heibel et al. ................ 188/156 |
| 6,139,460 A | * | 10/2000 | Drennen et al. ........... 188/72.1 |
| 6,315,086 B1 | * | 11/2001 | Schmitt et al. ............ 188/72.7 |
| 6,349,801 B1 | * | 2/2002 | Koth et al. ................. 188/72.8 |
| 6,561,321 B1 | * | 5/2003 | Klode et al. ............... 188/72.1 |
| 6,607,059 B1 | * | 8/2003 | Kapaan et al. ............. 188/72.8 |

FOREIGN PATENT DOCUMENTS

| DE | 3737381 | 5/1989 |
| DE | 19519310 | 11/1996 |
| DE | 19825683 | 7/1999 |
| DE | 19955080 | 5/2001 |
| EP | 0109918 | 5/1984 |
| WO | 9942739 | 8/1999 |
| WO | 0121975 | 3/2001 |

OTHER PUBLICATIONS

Search Report of the German Patent Office Appln No. 10128251.6.

* cited by examiner

*Primary Examiner*—Matthew C. Graham
*Assistant Examiner*—Mariano Sy
(74) *Attorney, Agent, or Firm*—Honigman Miller Schwartz and Cohn LLP

(57) ABSTRACT

An actuating unit for an electromechanically operable disc brake for automotive vehicles including a driving unit or an electric motor, an actuating element secured against rotation and causing one of two friction linings that are arranged slidably in a brake caliper to move into engagement with a brake disc, as well as a reducing gear interposed between the electric motor and the actuating element. To ensure the testability of the reducing gear, the present invention includes an anti-rotation mechanism of the actuating element be arranged in a gearbox casing accommodating the reducing gear.

8 Claims, 3 Drawing Sheets

OPERATING DEVICE FOR AN ELECTROMECHANICALLY ACTUATED DISK BRAKE

TECHNICAL FIELD

The present invention generally relates to vehicle brake systems and more particularly to an actuating unit for an electromechanically operable disc brake for automotive vehicles.

BACKGROUND OF THE INVENTION

An electromechanical actuating unit of this general type is disclosed in international patent application WO 99/42739. The actuating element in the prior-art actuating unit is formed of the threaded nut of a screw actuator that is used as a reducing gear and has its threaded spindle driven by an electric motor. The anti-rotation mechanism of the threaded nut is provided by means of axial extensions inserted into semi-circular openings of a bearing plate. The bearing plate forms a bearing both for the threaded nut and the threaded spindle.

It is disadvantageous in the prior-art actuating unit that the mentioned anti-rotation mechanism of the actuating element is inappropriate for a modular design of the actuating unit or, respectively, that the reducing gear employed is untestable. Another shortcoming is the comparatively high cost of the unit, which is primarily due to the costly manufacture of the bearing plate and the threaded nut. Still another shortcoming is the risk that the axial extensions will jam in the bearing plate, in particular in the initial phase of the build-up of the clamping force, with the result of an impaired efficiency.

BRIEF SUMMARY OF THE INVENTION

Therefore, an object of the present invention is to disclose an electromechanical actuating unit of the type mentioned hereinabove with a reducing gear that permits independent testing. Another objective is to eliminate the above-mentioned risk of jamming to the best possible extent and to minimize the axial overall length of the entire actuating unit.

According to the present invention, this object is achieved in that the means for providing the anti-rotation mechanism of the actuating element is arranged in a housing accommodating the reducing gear.

In a favorable improvement of the subject matter of this invention, the means are cylindrical rolls and grooves designed in the housing or the actuating element, respectively.

In this arrangement, it is especially advantageous that the cylindrical rolls are retained in a slide bearing that radially embraces the actuating element.

In another favorable aspect of the subject matter of the present invention, the means is provided by a profiling of the outside surface of the actuating element as well as a mating inside profiling of a slide bearing that is unrotatably incorporated in the housing and accommodates the actuating element.

Preferably, the slide bearing includes radial projections being received in recesses or grooves, respectively, designed in the housing.

In another embodiment of the subject matter of the present invention, the profiling of the outside surface of the actuating element and the inside profiling of the slide bearing are configured as a polygonal profile.

Further, it is particularly favorable that the reducing gear is designed as a screw actuator and that the actuating element is formed of the threaded nut of the screw actuator.

DETAILED DESCRIPTION OF THE PREFFERED EMBODIMENTS

Figure 1:
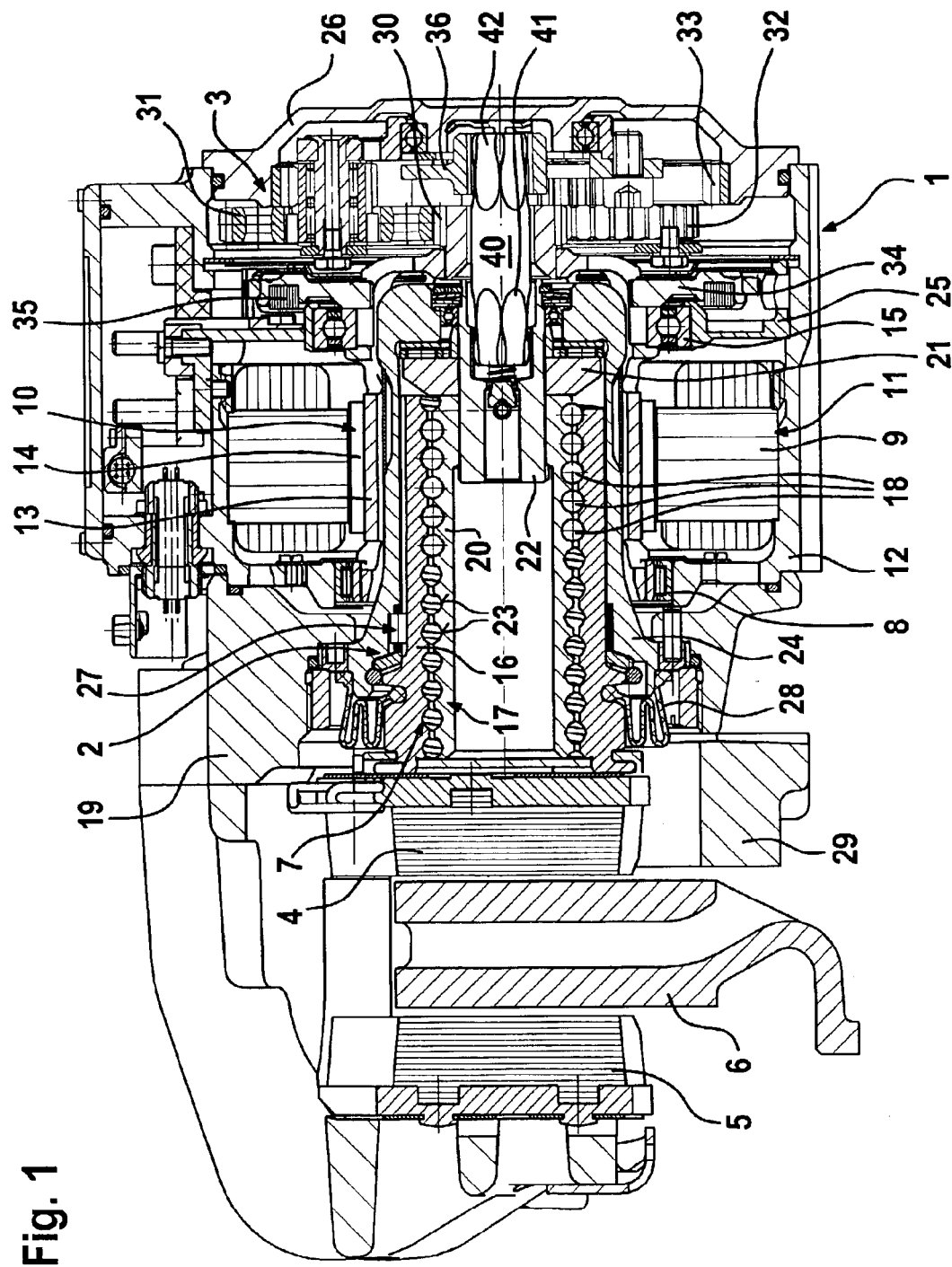
FIG. 1 is an axial cross-sectional view of an embodiment of the electromechanical actuating unit of the present invention.

The electromechanical actuating unit of the invention as illustrated in the drawings is used to actuate a floating-caliper disc brake, with the brake caliper (only partially represented) mounted in a stationary holder 29 so as to be slidable. A pair of friction linings 4 and 5 are mounted in the brake caliper so that they face the left and the right lateral surface of a brake disc 6.

In the following, friction lining 4 shown on the right hand in the drawing is referred to as first friction lining, and the other, opposing, friction lining carrying reference numeral 5 is referred to as second friction lining. While the first friction lining 4, by means of an actuating element 7, is movable into engagement with the brake disc 6 by the actuating unit directly, the second friction lining 5 is pressed against the opposite lateral surface of the brake disc 6 by the effect of a reaction force generated by the brake caliper when the arrangement is actuated.

The actuating unit of the present invention which is fitted to the brake caliper by means of fastening means (not shown) has a modular design and is mainly composed of three independent assemblies or modules, respectively, namely of a driving unit 1, first reducing gear 2 actuating the friction lining 4, and second reducing gear 3 interposed between the driving unit 1 and the first reducing gear 2 in terms of effect.

The driving unit 1 mentioned above is comprised of an electric motor 11 which, in the example shown, is a permanent-magnet-energized, electronically commutated motor whose stator 9 is immovably arranged in a motor casing 12 and whose rotor 10 is provided by an annular carrier 13 that carries a plurality of permanent magnet segments 14. The first reducing gear 2 is interposed between the electric motor 11 and the above-mentioned actuating element 7 in terms of effect and, in the example shown, is configured as a screw actuator 16 to 18 accommodated in a part 19, which may also be of integral design with the above-mentioned brake caliper. In this arrangement, the screw actuator comprises a threaded nut 16 and a threaded spindle 17, with several balls 18 being arranged between the threaded nut 16 and the threaded spindle 17 which circulate upon a rotational movement of the threaded spindle 17 and cause an axial or translatory movement of the threaded nut 16. The threaded nut 16 preferably forms the above-mentioned actuating element 7. Further, it can be taken from the drawing that the threaded spindle 17 driven by the electric motor 11 by way of the second reducing gear 3 has a three-part design and is comprised of a tubular first spindle member 20 which interacts with the threaded nut 16, an annular second spindle member 21, and a third spindle member 22 that interacts with the second reducing gear 3. The first spindle member 20 defines with the threaded nut 16 spiral-shaped screw thread undercuts 23 wherein the balls 18 circulate.

The arrangement is preferably chosen so that the rotor 10 of the electric motor 11 drives the spindle member 17 by the intermediary of the second reducing gear 3, and the threaded nut 16 is supported on the first friction lining 4. The rotor 10 is mounted in two radial bearings 8, 15 being arranged in the motor housing 12 or, respectively, in a bearing plate 25 that is axially supported on the motor housing 12.

In the embodiment of the present invention illustrated in the drawings, the necessary motor torque is reduced by an expedient integration of a planetary gear 30–34 forming the above-mentioned second reducing gear 3. The planetary gear, which is interposed between rotor 10 and threaded spindle 17 in terms of effect, is comprised of a sun wheel 30 which preferably includes an externally toothed area on rotor 10, a plurality of stepped planet wheels, two of which are shown and have been assigned reference numerals 31 and 32, and a ring gear 33. Ring gear 33 is formed of an internally toothed area of a cover 26 that represents the case of the planetary gear.

The third spindle member 22 is favorably connected to a planet cage 36 of the second reducing gear 3 by means of a coupling shaft 40. It is especially advantageous that both ends of the coupling shaft 40 and the areas of the third spindle member 22 and the planet cage 36 receiving these ends are so configured that two universal joints 41, 42 develop.

As may further be seen in FIG. 1, rotor 10 includes a radial collar 34 carrying components of a position detection system 35 (not shown) that is used to determine the current position of the rotor 10. The position information is then determined by means of a Hall sensor or a magnetoresistive element.

The above-mentioned screw actuator is preferably incorporated in a bowl-shaped gearbox casing 24 in such a fashion that its threaded nut 16 is secured against rotation by appropriate means. The anti-rotation means designated by reference numeral 27, is disposed in the area of the gearbox casing 24 close to the first friction lining 4. An elastic seal or sealing sleeve 28 compressed between the threaded nut 16 and the gearbox casing 24 prevents the ingress of contaminants into the interior of the screw actuator.

Figure 2:
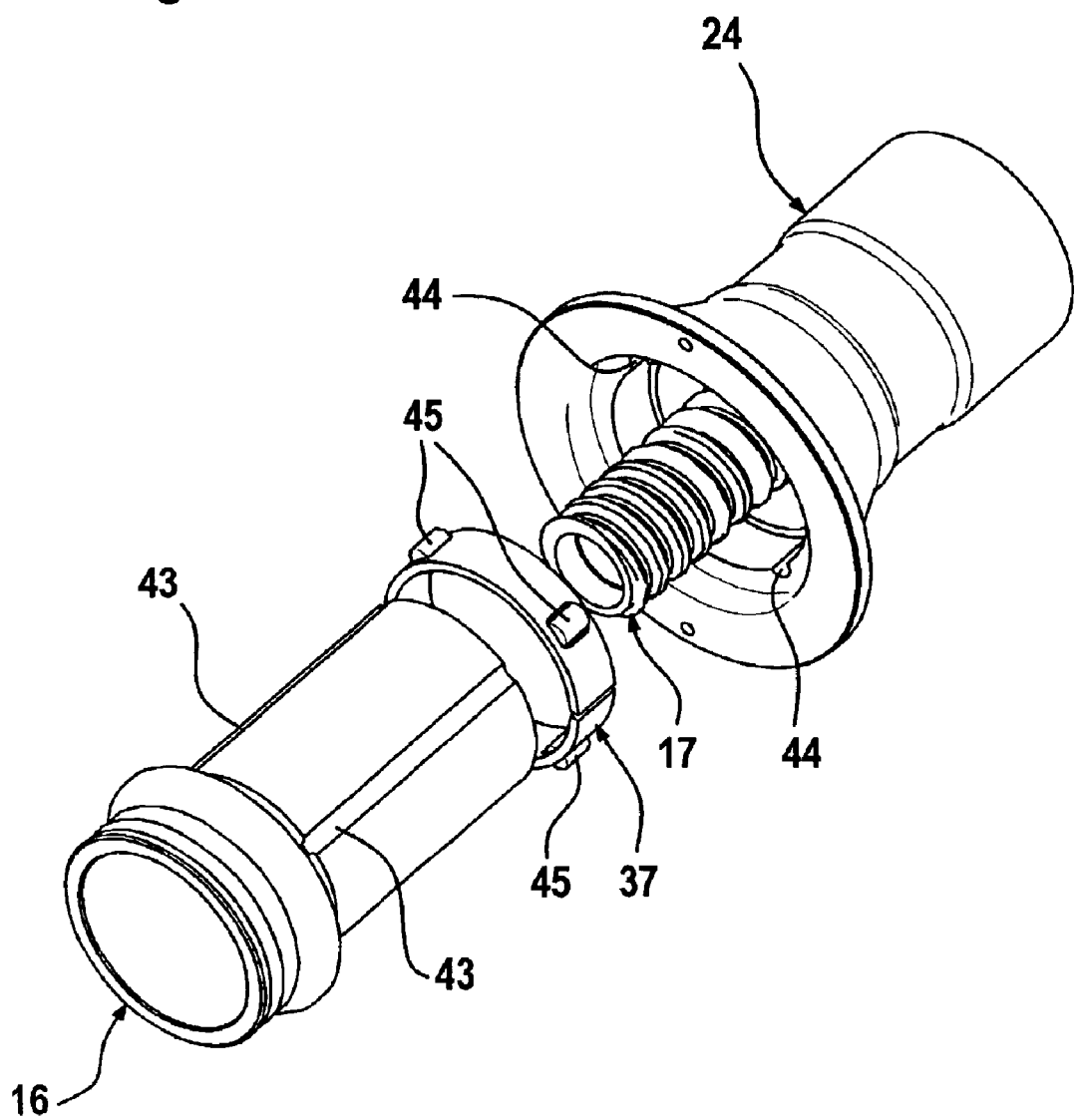
FIG. 2 is a simplified view of a first embodiment of reducing gear design that is employed in the actuating unit of the invention according to FIG. 1.

The constructive design of the anti-rotation means 27 is apparent from FIG. 2 in particular. It can be seen in the exploded view that the threaded nut 16 includes a plurality of axial grooves 43 on its cylindrical surface, while matingly shaped grooves 44 are provided in the inside wall of the gearbox casing 24. In the assembled condition of the screw actuator 16 to 18, grooves 43, 44 accommodate cylindrical rolls 45 that ensure the desired effect and are retained in an annular slide bearing 37.

Figure 3:
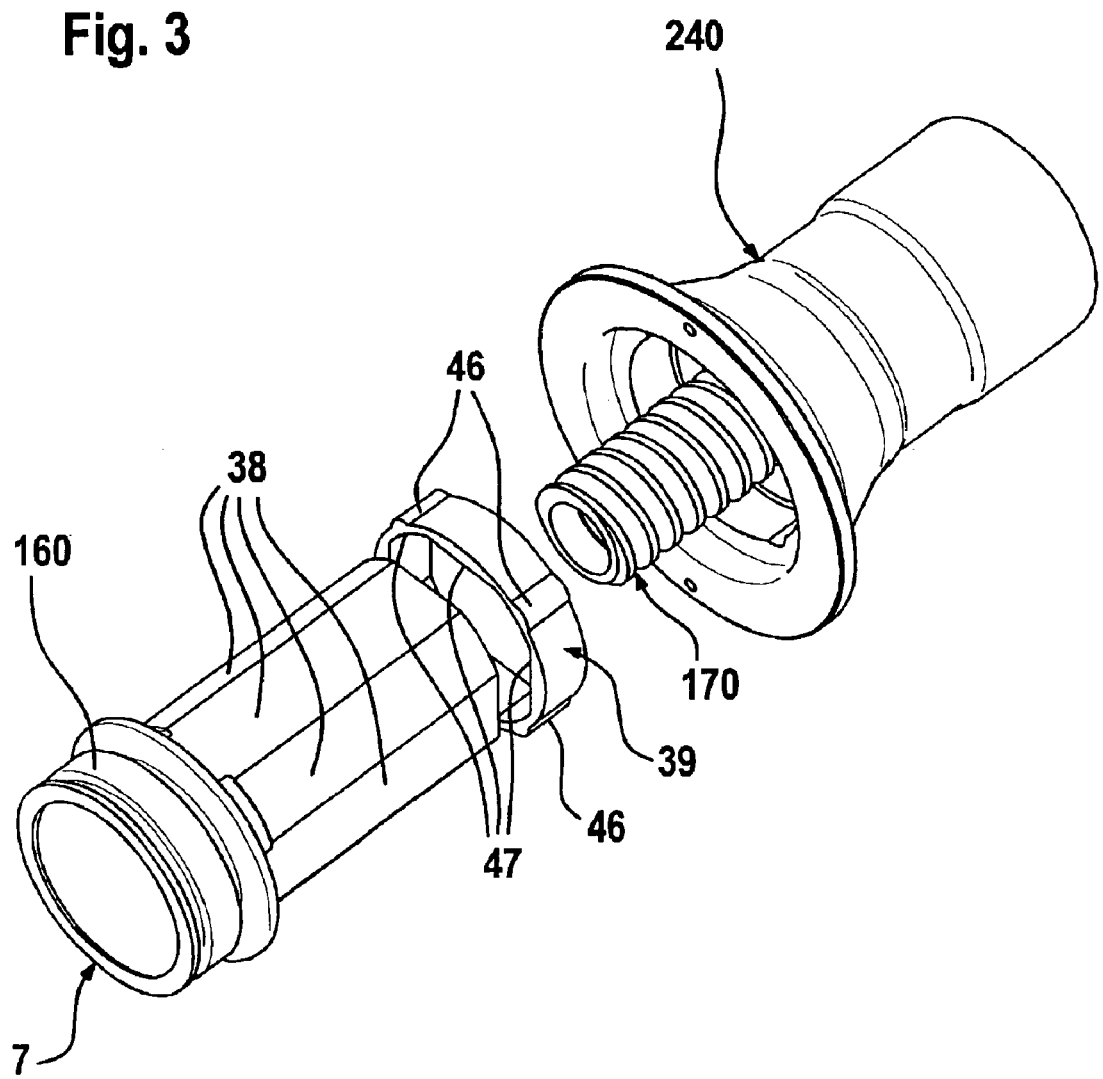
FIG. 3 is a simplified view of a second embodiment of the reducing gear.

In the second design of the reducing gear illustrated in FIG. 3 the above-mentioned anti-rotation mechanism is provided by an appropriate configuration of the respective components. For this purpose, the surface of the actuating element 7 or of the threaded nut 160 includes a profiling 38 having a polygonal shape in cross-section. An annular slide bearing 39 with radial projections 46 includes an inside profiling 47 corresponding to the profiling 38, said slide bearing being retained unrotatably in the gearbox casing 240 in the assembled condition. The effect of an anti-rotation mechanism of this type is fully obvious so that there is no need for explanations.

LIST OF REFERENCE NUMERALS 1 driving unit
2 reducing gear
3 reducing gear
4 friction lining
5 friction lining
6 brake disc
7 actuating element
8 radial bearing
9 stator
10 rotor
11 electric motor
12 motor casing
13 carrier
14 permanent magnet segment
15 radial bearing
16 threaded nut
17 threaded spindle
18 ball
19 part
20 spindle member
21 spindle member
22 spindle member
23 screw thread undercuts
24 gearbox casing
25 bearing plate
26 cover
27 anti-rotation mechanism
28 seal
29
30 sun wheel
31 planet wheel
32 planet wheel
33 ring gear
34 collar
35 position detection system
36 planet cage
37 slide bearing
38 profiling
39 slide bearing
40 coupling shaft
41 universal joint
42 universal joint
43 axial groove
44 groove
45 cylindrical roll
46 projection
47 inside profiling
160 threaded nut
170 threaded spindle
240 gearbox casing

What is claimed is:

1. Actuating unit for an electromechanically actuated disc brake assembly for automotive vehicles, said assembly including a brake caliper in which two friction linings that cooperate with each one lateral surface of a brake disc are arranged so as to be displaceable within limits, wherein one of the friction linings is directly movable into engagement with the brake disc by the actuating unit and the other friction lining is movable into engagement with the brake disc by the effect of a reaction force produced by the brake caliper, said actuating unit comprising:

at least one electric motor, a reducing gear coupled to the electric motor, wherein said reducing gear is disposed within a gearbox casing, an actuating element coupled to the reducing gear, means for providing anti-rotation of the actuating element, wherein the actuating element is arranged in the gearbox casing, wherein the anti-rotation means include cylindrical rolls and also include grooves formed in the gearbox casing or the actuating element respectively.

2. Actuating unit as claimed in claim 1, wherein cylindrical rolls are retained in a slide bearing that embraces the actuating element in a radial direction.

3. Actuating unit as claimed in claim 1, wherein the anti-rotation means is provided by a profiling an outside surface of the actuating element as well as profiling a mating inside surface of a slide bearing.

4. Actuating unit as claimed in claim 3, wherein the slide bearing includes radial projections received in recesses or grooves.

5. Actuating unit as claimed in claim 3, wherein the profiling of the outside surface of the actuating element and the profiling of the inside surface of the slide bearing are configured as a polygonal profile.

6. Acting unit as claimed in claim 1, wherein the reducing gear is designed as a screw actuator, and wherein the actuating element is formed from a threaded nut of the screw actuator.

7. Actuating unit for an electromechanically actuated disc brake assembly for automotive vehicles, said assembly of the type including a brake caliper in which two friction linings that cooperate with each one lateral surface of a brake disc are arranged so as to be displaceable within limits, wherein one of the friction linings is directly movable into engagement with the brake disc by the actuating unit and the other friction lining is movable into engagement with the brake disc by the effect of a reaction force produced by the brake caliper, said actuating unit comprising:

at least one electric motor, a reducing gear coupled to the electric motor, wherein said reducing gear is disposed within a gearbox casing, an actuating element coupled to the reducing gear, means for providing anti-rotation of the actuating element, wherein the actuating element is arranged in the gearbox casing, wherein the anti-rotation means is provided by a profiling an outside surface of the actuating element as well as profiling a mating inside surface of a slide bearing, wherein the slide bearing includes radial projections received in recesses or grooves.

8. Actuating unit for an electromechanically actuated disc brake assembly for automotive vehicles, said assembly of the type including a brake caliper in which two friction linings that cooperate with each one lateral surface of a brake disc are arranged so as to be displaceable within limits, wherein one of the friction linings is directly movable into engagement with the brake disc by the actuating unit and the other friction lining is movable into engagement with the brake disc by the effect of a reaction force produced by the brake caliper, said actuating unit comprising:

at least one electric motor, a reducing gear coupled to the electric motor, wherein said reducing gear is disposed within a gearbox casing, an actuating element coupled to the reducing gear, means for providing anti-rotation of the actuating element, wherein the actuating element is arranged in the gearbox casing, wherein the anti-rotation means is provided by a profiling an outside surface of the actuating element as well as profiling a mating inside surface of a slide bearing, wherein the profiling of the outside surface of the actuating element and the profiling of the inside surface of the slide bearing are configured as a polygonal profile.

* * * * *